United States Patent
Holmes

(10) Patent No.: US 9,765,869 B2
(45) Date of Patent: Sep. 19, 2017

(54) DUAL CLUTCH CONTINUOUSLY VARIABLE TRANSMISSION

(71) Applicant: GM Global Technology Operations LLC, Detroit, MI (US)

(72) Inventor: Alan G. Holmes, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 14/795,744

(22) Filed: Jul. 9, 2015

(65) Prior Publication Data

US 2017/0009863 A1   Jan. 12, 2017

(51) Int. Cl.
*F16H 3/08*   (2006.01)
*F16H 37/02*   (2006.01)
*B60K 17/344*   (2006.01)

(52) U.S. Cl.
CPC .......... *F16H 37/021* (2013.01); *B60K 17/344* (2013.01)

(58) Field of Classification Search
CPC ....................... F16H 37/021; F16H 2003/0931
USPC ................................... 74/330, 331, 333, 340
See application file for complete search history.

(56) References Cited

U.S. PATENT DOCUMENTS

| 4,489,622 A * | 12/1984 | Underwood | F16H 37/021 192/48.612 |
| 6,634,247 B2 * | 10/2003 | Pels | B60K 6/26 477/6 |
| 7,963,191 B2 | 6/2011 | Holmes | |
| 8,070,649 B2 | 12/2011 | Holmes | |
| 8,191,441 B2 | 6/2012 | Holmes | |
| 9,616,739 B2 * | 4/2017 | Hwang | B60K 6/543 |

OTHER PUBLICATIONS

Pending U.S. Appl. No. 14/615,713, filed Feb. 6, 2015, by Peter R. Garcia. All pages.
Pending U.S. Appl. No. 14/477,415, filed Sep. 4, 2014, by Dan Coffey. All pages.

* cited by examiner

*Primary Examiner* — Ha D Ho

(57) ABSTRACT

A dual clutch continuously variable transmission ("CVT") includes an input member connected to an engine of the motor vehicle, an output member connected to a final drive unit, a first member, a second member, a third member, and a dual input assembly having a first element and a second element. The dual input member may be a dual clutch or a torque converter and clutch assembly. The dual clutch CVT also includes a fixed gear assembly having a first co-planar gear set selectively connectable to the first member and fixedly connected to the third member and a second co-planar gear set fixedly connected to the third member and fixedly connected to the output member. A continuously variable unit is connected directly to the second member and the third member. The output from the fixed gear unit may be connected to drive wheels separate from the continuously variable unit.

20 Claims, 3 Drawing Sheets

DUAL CLUTCH CONTINUOUSLY VARIABLE TRANSMISSION

FIELD

The present disclosure relates to automatic transmissions and more particularly to a dual clutch continuously variable transmission.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a double gear final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

A dual clutch transmission ("DCT") typically includes a pair of mutually exclusively operating input clutches which drive a pair of layshafts or countershafts disposed on opposite sides of an output shaft. One of each of a plurality of pairs of constantly meshing gears which define the various forward gear ratios is freely rotatably disposed on one of the layshafts and the other of each pair of gears is coupled to the output shaft. A plurality of dog clutches or synchronizers selectively couple one of the gears to the layshaft to achieve a forward gear ratio. After the dog clutch is engaged, the input clutch associated with the active layshaft is engaged. Dual clutch transmissions are known for their sporty, performance oriented shift characteristics. They typically exhibit good fuel economy due to good gear mesh efficiency and ratio selection flexibility in design. The dog clutches have low spin losses which also contributes to overall operating efficiency.

Both CVT and DCT transmissions have their advantages, however, there is a need in the art for a dual clutch CVT that has continuously variable operation which is efficient at lower loads and fixed ratio operation which is efficient at relatively higher loads.

SUMMARY

A dual clutch CVT is provided for a motor vehicle The dual clutch CVT includes an input member connected to an engine of the motor vehicle, an output member connected to a final drive unit, a first member, a second member, a third member, and a dual input assembly having a first element and a second element. The first element selectively connects the first member to the input member and the second element selectively connects the second member to the input member. The dual clutch CVT also includes a fixed gear assembly having a first co-planar gear set selectively connectable to the first member and fixedly connected to the third member and a second co-planar gear set fixedly connected to the third member and fixedly connected to the output member. A continuously variable unit is connected directly to the second member and the third member.

In one aspect, the first co-planar gear set includes a drive gear in mesh with a driven gear and the drive gear of the first co-planar gear set is selectively rotationally connectable to the first member and the driven gear of the first co-planar gear set is fixedly rotationally connected to the third member.

In another aspect, the second co-planar gear set includes a first drive gear in mesh with a driven gear and the first drive gear of the second co-planar gear set is fixedly rotationally connected to the third member and the driven gear of the second co-planar gear set is fixedly rotationally connected to the output member.

In yet another aspect, the first element is a first clutch and the second element is a second clutch.

In yet another aspect, engagement of the first clutch produces at least one fixed gear ratio, engagement of the second clutch produces a continuously variable ratio, and engagement of both clutches distributes power from the engine between the fixed gear assembly and the continuously variable unit.

In yet another aspect, the second co-planar gear set includes a second drive gear in mesh with the driven gear of the second co-planar gear set and the second drive gear of the second co-planar gear set is selectively rotationally connectable to the first member.

In yet another aspect, a synchronizer assembly is disposed on the first member between the drive gear of the first co-planar gear set and the second drive gear of the second co-planar gear set, and the synchronizer assembly selectively rotationally connects the drive gear of the first co-planar gear set to the first member and selectively rotationally connects the second drive gear of the second co-planar gear set to the first member.

In yet another aspect, the first element is a torque converter with no lock-up clutch and the second element is a friction clutch.

In yet another aspect, the transmission output shaft is connected to a first final drive unit.

In yet another aspect, a first bevel gear is in mesh with a second bevel gear and the first bevel gear is selectively rotationally connectable to the first member and the second bevel gear is connected to a second final drive unit.

In yet another aspect, a first synchronizer assembly selectively rotationally connects the drive gear of the first co-planar gear set to the first member and a second synchronizer assembly selectively rotationally connects the first bevel gear to the first member.

In yet another aspect, the continuously variable unit includes a first pulley connected for common rotation with the second member, a second pulley connected for common rotation with the third member, and an endless member wrapped around the first pulley and the second pulley.

Further aspects, examples, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
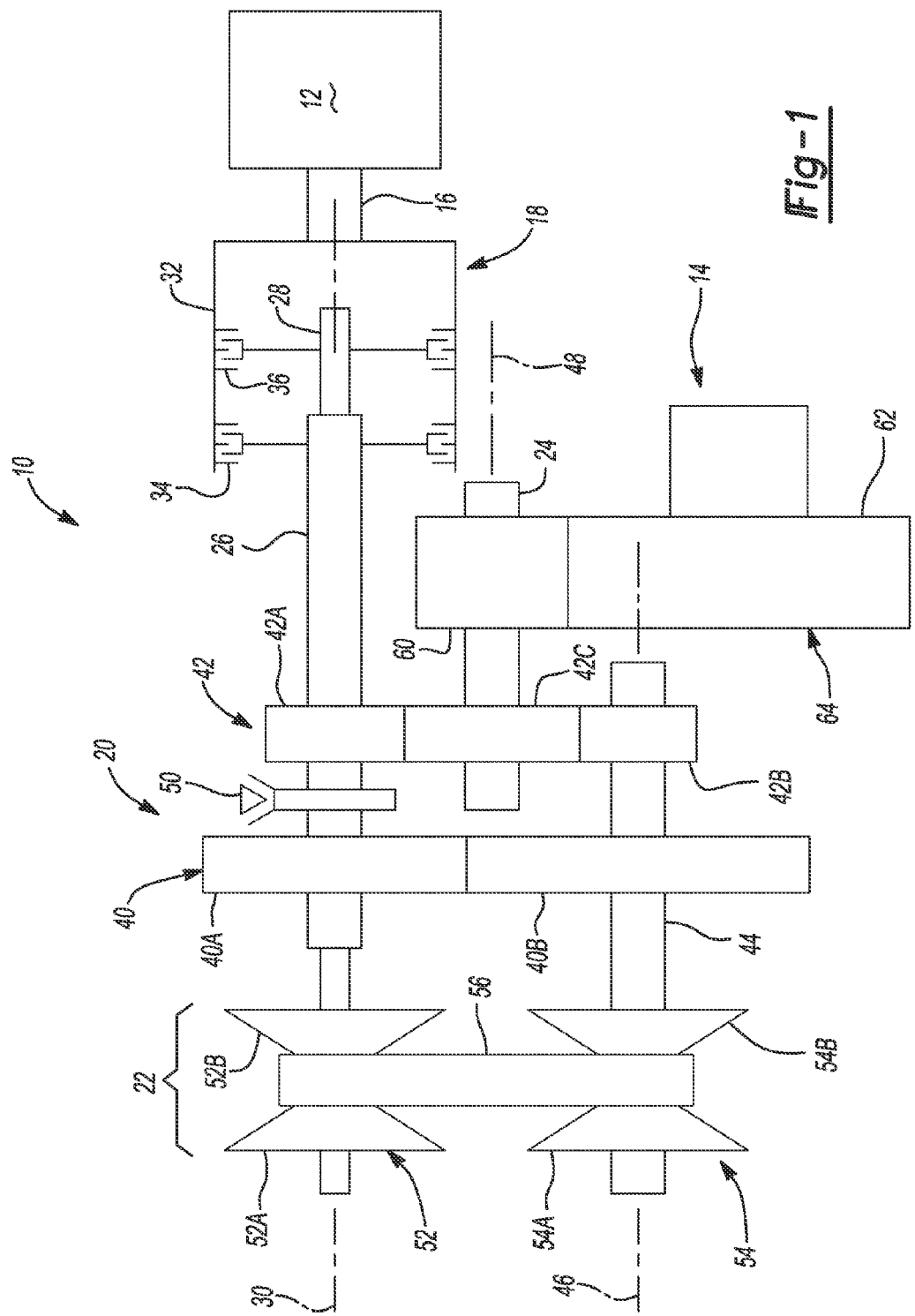
FIG. 1 is a schematic view of a dual clutch continuously variable transmission according to the principles of the present invention.

With reference to FIG. 1, a dual clutch continuously variable transmission ("CVT") for use in a powertrain of a motor vehicle is generally indicated by reference number 10. The dual clutch CVT 10 is interconnected to an engine 12 and a final drive unit 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the dual clutch CVT 10 through, for example, a transmission input shaft or member 16. The transmission input member 16 may be separate from the transmission 10 and form part of or be connected with a flywheel or other output from the engine 12.

The dual clutch CVT 10 generally includes a dual clutch or input assembly 18, a fixed gear assembly 20, and a continuously variable unit 22 that cooperate to provide a plurality of stepped and continuous gear or speed ratios between the transmission input member 16 and a transmission output member 24. For example, the dual clutch assembly 18 selectively connects the transmission input member 16 to one of a sleeve shaft or first member 26 and a center shaft or second member 28. The first member 26 is a sleeve shaft that is concentric with and overlies the second member 28. The first and second members 26, 28 rotate about a first axis of rotation 30. The dual clutch assembly 18 also includes a clutch housing 32, a first clutch element 34, and a second clutch element 36. The clutch housing 32 is connected for common rotation with the transmission input member 16. The first clutch element 34 selectively rotationally couples the clutch housing 32 to the first member 26. The second clutch element 36 selectively rotationally couples the clutch housing 32 to the second member 28. The clutch elements 34 and 36 are preferably friction clutches that include, for example, interleaved friction plates mounted on the clutch housing 16, the first member 26, the second member 28, or alternatively intervening clutch hubs or otherwise coupled thereto, that interact to form a friction clutch. The dual clutch assembly 18 may be either a dry or a wet clutch assembly.

The fixed gear assembly 20 is selectively connectable to the first member 26 and includes a first co-planar gear set 40 and a second co-planar gear set 42. The first co-planar gear set 40 includes a drive gear 40A intermeshed with a driven gear 40B. The drive gear 40A is selectively rotationally connectable to the first member 26. The driven gear 40B is fixedly connected for common rotation to a third shaft or member 44. The third member 44 is axially offset from the first axis 30 and rotates about a second axis 46.

The second co-planar gear set 42 includes a first drive gear 42A, a second drive gear 42B, and a driven gear 42C. The first drive gear 42A and the second drive gear 42B are both in mesh with the driven gear 42C. The first drive gear 42A is selectively rotationally connectable to the first member 26. The second drive gear 42B is fixedly connected for common rotation to the third member 44. The driven gear 42C is fixedly connected for common rotation to the transmission output shaft 24. The transmission output shaft 24 is axially offset from both the first and second axes 30, 42 and rotates about a third axis 48.

The drive gears 40A and 42A are selectively connectable to the first member 26 by a dog clutch or synchronizer assembly 50. In the example provided, the synchronizer 50 is a double sided synchronizer that generally includes a shift fork (not shown) that is bi-directionally translated by an actuator (not shown) into at least two engaged positions and a neutral or disengaged position. Thus, the synchronizer 50 is selectively actuated to connect the drive gear 40A with the first member 26 and is selectively actuated to connect the drive gear 42A with the first member 26.

The continuously variable unit 22 is connected and driven by the second member 28. In the example provided the continuously variable unit 22 is illustrated and will be described as a variable diameter pulley or sheave drive continuously variable unit. However, it should be appreciated that the continuously variable unit 22 may use a curved or tapered roller unit, differential gearing with a pair of electric motor-generators, or an electric generator coupled to an electric motor without departing from the scope of the present invention so long as an input torque is received and continuously variable output torque is produced. The continuously variable unit 22 in the present example includes a first pulley or sheave 52 and a second pulley or sheave 54. The first pulley 52 includes a first truncated conical member or first pulley half 52A and a second truncated conical member or second pulley half 52B in axial alignment with the first pulley half 52A. One of the first or second pulley halves 52A, 52B is directly connected for common rotation with the second member 28 while the other of the first and second pulley halves 52A, 52B is axially moveable. For example, the first pulley half 52A may be directly connected for common rotation with the second member 28 while the second pulley half 52B may be moveable axially relative to the first pulley half 52A by a hydraulic controlled piston (not shown) or other actuating system. It should be appreciated that the pulley halves 52A, 52B may be axially switched without departing from the scope of the present invention.

The second pulley 54 includes a first truncated conical member or first pulley half 54A and a second truncated conical member or second pulley half 54B in axial alignment with the first pulley half 54A. One of the first or second pulley halves 54A, 54B is directly connected for common rotation with the third member 44 while the other of the first and second pulley halves 54A, 54B is axially moveable. For example, the first pulley half 54A may be directly connected for common rotation with the third member 44 while the second pulley half 54B may be moveable axially relative to the first pulley half 54A by a hydraulic controlled piston (not shown) or other actuating system. It should be appreciated that the pulley halves 54A, 54B may be axially switched without departing from the scope of the present invention.

A torque transmitting endless member 56, such as a belt or chain, having an approximately V-shaped cross section is mounted between the first pulley 52 and the second pulley 54. Drive torque communicated from the second member 28 to the first pulley 52 is transferred via friction to the endless member 56 and transferred via friction to the second pulley 54. The ratio of the first pulley 52 to the second pulley 54 is adjusted by varying the spacing between the pulley halves 52A, 52B and between the pulley halves 54A, 54B. For example, to change the ratio between the pulleys 52 and 54, the axial distance between pulley halves 52A and 52B may be reduced by moving pulley half 52B towards pulley half 52A while simultaneously the axial distance between pulley halves 54A and 54B may be increased by moving pulley half 54B away from pulley half 54A. Due to the V-shaped cross section of the endless member 56, the endless member 56 rides higher on the first pulley 52 and lower on the second pulley 54. Therefore the effective diameters of the pulleys 52 and 54 change, which in turn changes the overall gear ratio between the first pulley 52 and the second pulley 54. Since the radial distance between the pulleys 52 and 53 and the length of the endless member 56 is constant, the movement of the pulley halves 52B and 54B must occur simultaneously in order to maintain the proper amount of tension on the endless member 56 to assure torque is transferred between the pulleys 52, 54 and the endless member 56.

The transmission output member 24 is connected for common rotation to a transfer gear 60. The transfer gear 60 is in mesh with the final drive unit 14. For example, the transfer gear 60 may be in mesh with a differential housing 62 of a differential 64 in the final drive unit 14. The differential 64 drives a set of axels (not shown) that are connected to a set of road wheels (not shown). The final drive unit 14 may also split the output from the continuously variable unit 22 and the fixed gear assembly 20. For example, the final drive unit 14 may couple the output from the continuously variable unit 22 to front wheels of the motor vehicle while the output from the fixed gear assembly 20 may be connected to rear wheels of the motor vehicle to support traction and improve acceleration.

During operation of the dual clutch CVT 10, power (rotational speed and torque) is supplied to the dual clutch assembly 18 from the engine 12. In a first operating condition, the first clutch element 34 is engaged (i.e. transferring rotational speed and torque) and the second clutch element 36 is disengaged (i.e. not transferring rotational speed and torque). Thus, power is transferred from the clutch hub 32 to the first member 26. Simultaneously, the synchronizer assembly 50 is actuated to couple either the drive gear 40A to the first member 26 or the drive gear 42A to the first member 26. Coupling the drive gear 40A to the first member 26 provides a fixed, reverse speed or gear ratio through the drive gear 40A and the driven gear 40B to the third member 44 and to the second drive gear 42B to the driven gear 42C. Coupling the drive gear 42A to the first member 26 provides a fixed, forward speed or gear ratio through the drive gear 42A to the driven gear 42C. Power is then transferred, in either a fixed forward or reverse gear ratio, on to the transmission output member 24 and the final drive unit 14 to propel the motor vehicle. In one embodiment, the first operating condition is engaged during a launch of the vehicle from a near standstill. In another embodiment, the first operating condition is engaged during relatively high power output from the engine 12.

In a second operating condition, the first clutch element 34 is disengaged (i.e. transferring rotational speed and torque) and the second clutch element 36 is engaged (i.e. not transferring rotational speed and torque). Thus, power is transferred from the clutch hub 32 to the second member 28. The power is transferred from the second member 28 to the continuously variable unit 22 where movement of the pulleys 52, 54 provides a range of continuous forward speed or gear ratios to the second member 44. The power from the second member 44 is then transferred through the second drive gear 42B to the driven gear 42C and on to the transmission output member 24 and the final drive unit 14 to propel the motor vehicle. In one embodiment, the second operating condition is engaged during low or medium power outputs from the engine 12.

In a third operating condition, both the first clutch element 34 and the second clutch element 36 are engaged (i.e. transferring rotational speed and torque). Thus, both the fixed gear assembly 20 and the continuously variable unit 22 to share the load from the engine 12. Controlling the output gear ratio of the continuously variable unit 22 controls the load placed on the continuously variable unit 22.

Figure 2:
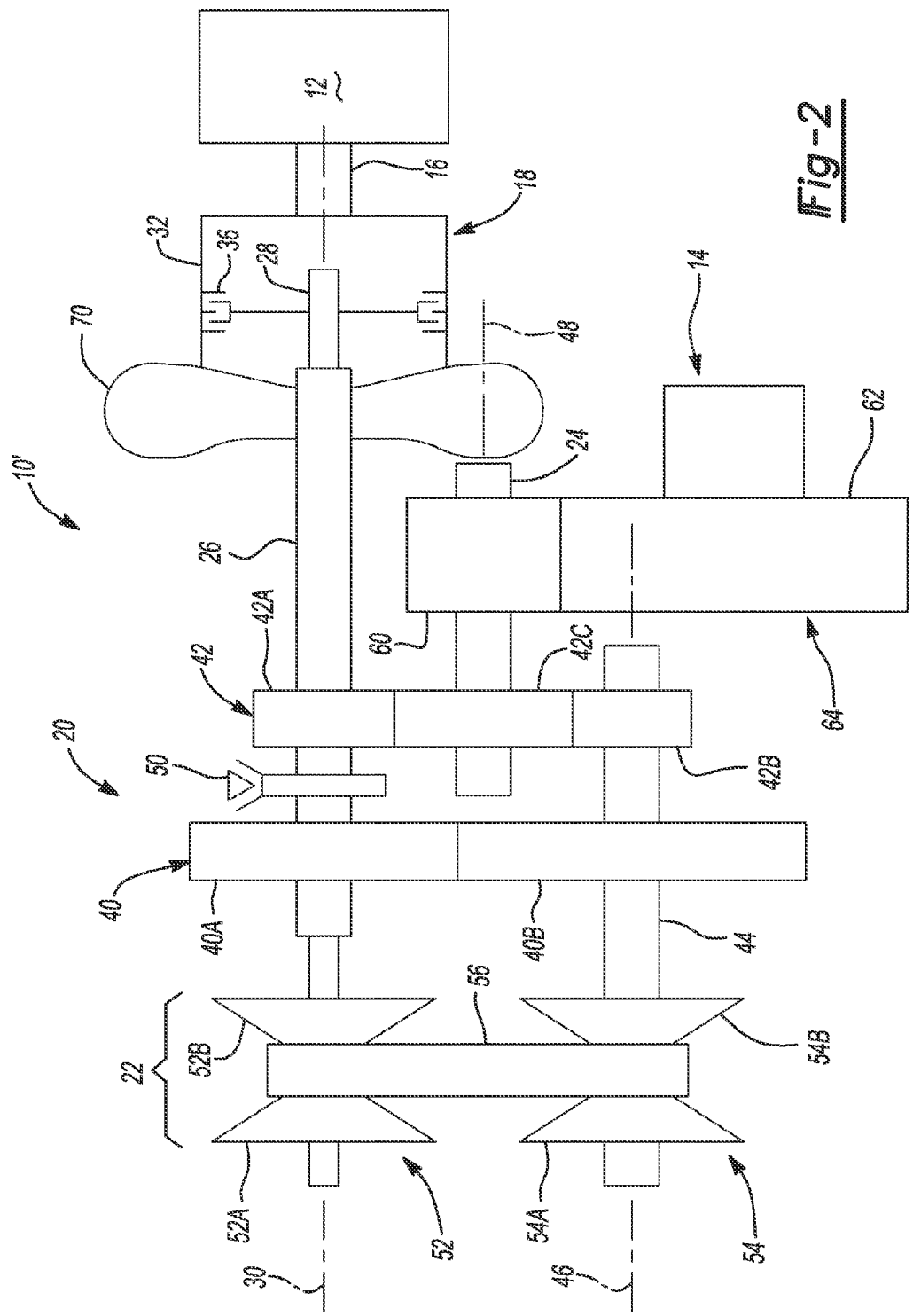
FIG. 2 is a schematic view of another dual clutch continuously variable transmission according to the principles of the present invention.

Turning to FIG. 2, an alternate embodiment of a transmission according to the principles of the present invention is generally indicated by reference number 10'. The transmission 10' is substantially similar to the dual clutch CVT 10 shown in FIG. 1 and therefore like components are indicated by like reference numbers. However, in the transmission 10', the first clutch element 34 is replaced with a simple, non-lockup torque converter 70. The torque converter 70 hydraulically couples the clutch housing 32 to the first member 26. Thus, the transmission 10' has forward and reverse launch using the torque converter 70. A lockup (i.e. mechanical connection) between the engine 12 and the transmission output member 22 occurs in the second operating condition where the second clutch element 36 is engaged and power is supplied to the continuously variable unit 22. Load may be shared between the fixed gear system 20 and the continuously variable unit 22 and the torque converter 70.

Figure 3:
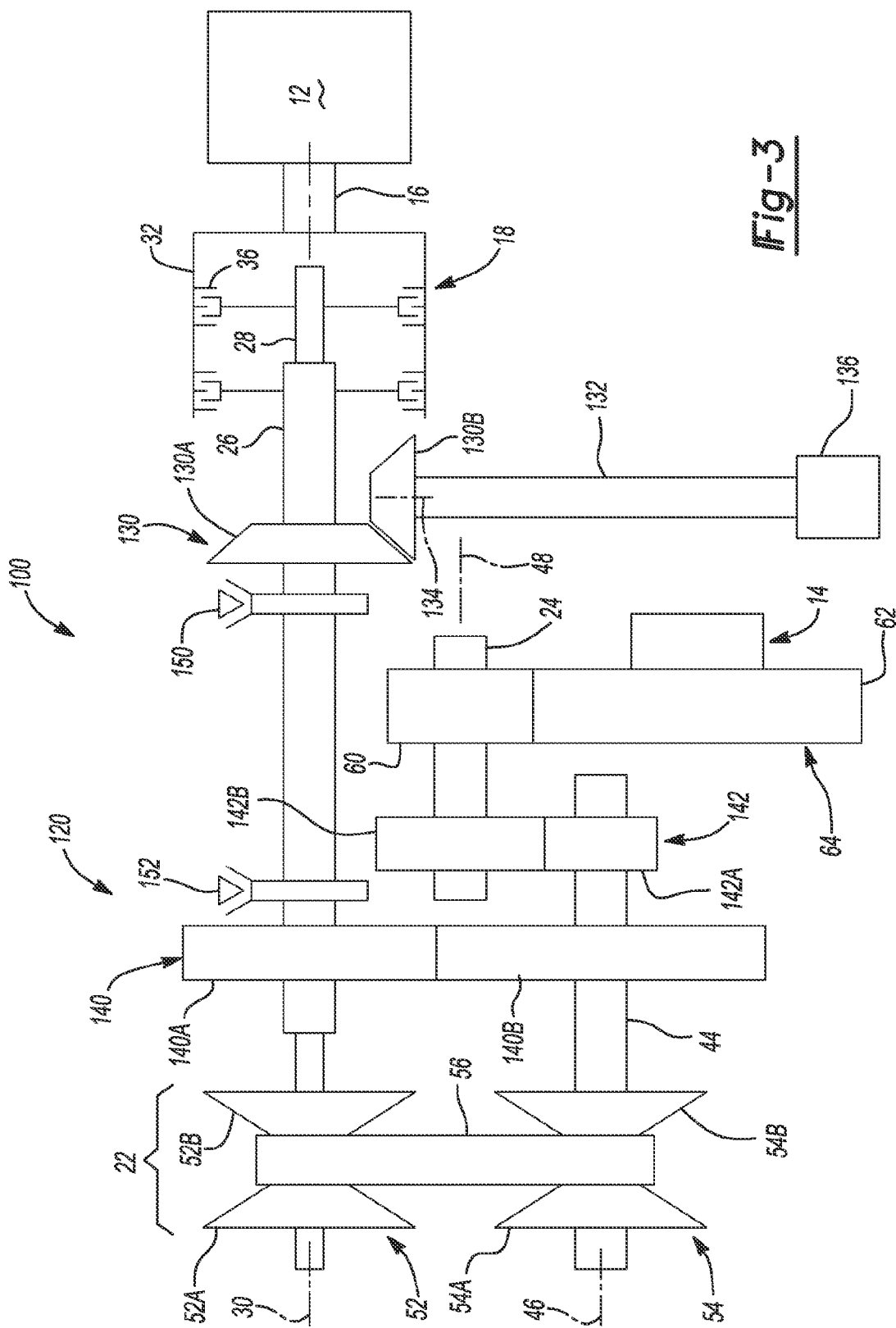
FIG. 3 is a schematic view of yet another dual clutch continuously variable transmission according to the principles of the present invention.

With reference to FIG. 3, another transmission according to the principles of the present invention is indicated by reference number 100. The transmission 100 is similar to the dual clutch CVT 10 shown in FIG. 1 and therefore like components are indicated by like reference numbers. Likewise, the torque converter 70 in the transmission 10' shown in FIG. 2 may be employed with the transmission 100. In the transmission 100, the fixed gear system 20 has been replaced with an alternate fixed gear system 120. The fixed gear system 120 includes a geared output drive 130 selectively connectable to the first member 26. The geared output drive 130 may take various forms but generally includes a first bevel gear 130A in mesh with a second bevel gear 130B. The second bevel gear 130B is connected to an axle 132 that rotates about an axis 134 angled or perpendicular to the axes 30, 46, 48. The axle 132 is preferably connected to a second final drive unit 136 that may include, for example, a differential (not shown) and a set of rear road wheels (not shown) in the motor vehicle.

The fixed gear system 120 also includes a first co-planar gear set 140 and a second co-planar gear set 142. The first co-planar gear set 140 includes a drive gear 140A intermeshed with a driven gear 140B. The drive gear 140A is selectively rotationally connectable to the first member 26. The driven gear 140B is fixedly connected for common rotation to the third member 44.

The second co-planar gear set 142 includes a first drive gear 142A intermeshed with a driven gear 142B. The first drive gear 142A is fixedly connected for common rotation to the third member 44. The driven gear 142B is fixedly connected for common rotation to the transmission output shaft 24.

The bevel gear 130A and the drive gear 140A are each selectively connectable to the first member 26 by dog clutches or synchronizer assemblies 150 and 152, respectively. In the example provided, the synchronizers 150, 152 are single sided synchronizers that generally include a shift fork (not shown) that is bi-directionally translated by an actuator (not shown) into at least one engaged position and a neutral or disengaged position. Thus, the synchronizer 150 is selectively actuated to connect the bevel gear 130A with the first member 26 and the synchronizer 152 is selectively actuated to connect the drive gear 140A with the first member 26.

In the first operating condition where the first clutch element 34 is engaged and the second clutch element 36 is disengaged, power may be transferred to either the bevel gear 130A when the synchronizer 150 is actuated or to the gear set 140 when the synchronizer 152 to actuated. Actuation of the synchronizer 150 produces a forward, rear-wheel drive fixed gear ratio. Actuation of the synchronizer 152 produces a reverse, front-wheel drive fixed gear ratio. In the second operating condition where the first clutch element 34 is disengaged and the second clutch element 36 is engaged, power is transferred through the continuously variable unit 22. In the third operating condition where both the first clutch element 34 and the second clutch element 36 are engaged, actuation of synchronizer 152 produces an all-wheel drive state controlled by the continuously variable unit 22.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission driven by an engine in a motor vehicle, the transmission comprising:
   an input member connected to the engine;
   an output member;
   a first member;
   a second member;
   a third member;
   a dual input assembly having a first element and a second element, wherein the first element selectively connects the first member to the input member and the second element selectively connects the second member to the input member;
   a fixed gear assembly having a first co-planar gear set selectively connectable to the first member and fixedly connected to the third member and a second co-planar gear set fixedly connected to the third member and fixedly connected to the output member; and
   a continuously variable unit connected directly to the second member and the third member.

2. The transmission of claim 1 wherein the first co-planar gear set includes a drive gear in mesh with a driven gear and the drive gear of the first co-planar gear set is selectively rotationally connectable to the first member and the driven gear of the first co-planar gear set is fixedly rotationally connected to the third member.

3. The transmission of claim 2 wherein the second co-planar gear set includes a first drive gear in mesh with a driven gear and the first drive gear of the second co-planar gear set is fixedly rotationally connected to the third member and the driven gear of the second co-planar gear set is fixedly rotationally connected to the output member.

4. The transmission of claim 3 wherein the first element is a first clutch and the second element is a second clutch.

5. The transmission of claim 4 wherein engagement of the first clutch produces at least one fixed gear ratio, engagement of the second clutch produces a continuously variable ratio, and engagement of both clutches distributes power from the engine between the fixed gear assembly and the continuously variable unit.

6. The transmission of claim 3 wherein the second co-planar gear set includes a second drive gear in mesh with the driven gear of the second co-planar gear set and the second drive gear of the second co-planar gear set is selectively rotationally connectable to the first member.

7. The transmission of claim 6 further comprising a synchronizer assembly disposed on the first member between the drive gear of the first co-planar gear set and the second drive gear of the second co-planar gear set, wherein the synchronizer assembly selectively rotationally connects the drive gear of the first co-planar gear set to the first member and selectively rotationally connects the second drive gear of the second co-planar gear set to the first member.

8. The transmission of claim 3 wherein the first element is a torque converter with no lock-up clutch and the second element is a friction clutch.

9. The transmission of claim 3 wherein the transmission output shaft is connected to a first final drive unit.

10. The transmission of claim 9 further comprising a first bevel gear in mesh with a second bevel gear and the first bevel gear is selectively rotationally connectable to the first member and the second bevel gear is connected to a second final drive unit.

11. The transmission of claim 10 further comprising a first synchronizer assembly and a second synchronizer assembly, wherein the first synchronizer assembly selectively rotationally connects the drive gear of the first co-planar gear set to the first member and the second synchronizer assembly selectively rotationally connects the first bevel gear to the first member.

12. The transmission of claim 1 wherein the continuously variable unit includes a first pulley connected for common rotation with the second member, a second pulley connected for common rotation with the third member, and an endless member wrapped around the first pulley and the second pulley.

13. A transmission driven by an engine in a motor vehicle, the transmission comprising:
   an input member connected to the engine;
   an output member;
   a first member;
   a second member;
   a third member;
   a dual clutch assembly having a first clutch and a second clutch, wherein the first clutch selectively connects the first member to the input member and the second clutch selectively connects the second member to the input member;
   a fixed gear assembly having a first gear set selectively connectable to the first member and fixedly connected to the third member and a second gear set fixedly connected to the third member and fixedly connected to the output member; and
   a continuously variable unit connected directly to the second member and the third member, and
   wherein engagement of the first clutch produces at least one fixed gear ratio, engagement of the second clutch produces a continuously variable ratio, and engagement of both clutches distributes power between the fixed gear assembly and the continuously variable unit.

14. The transmission of claim 13 wherein the first gear set includes a drive gear in mesh with a driven gear and the drive gear of the first gear set is selectively rotationally connectable to the first member and the driven gear of the first gear set is fixedly rotationally connected to the third member.

15. The transmission of claim 14 wherein the second gear set includes a first drive gear in mesh with a driven gear and the first drive gear of the second gear set is fixedly rotationally connected to the third member and the driven gear of the second gear set is fixedly rotationally connected to the output member.

16. The transmission of claim 15 wherein the second gear set includes a second drive gear in mesh with the driven gear of the second gear set and the second drive gear of the second gear set is selectively rotationally connectable to the first member.

17. The transmission of claim 16 further comprising a synchronizer assembly disposed on the first member between the drive gear of the first gear set and the second drive gear of the second gear set, wherein the synchronizer assembly selectively rotationally connects the drive gear of the first gear set to the first member to engage a fixed reverse gear ratio and selectively rotationally connects the second drive gear of the second gear set to the first member to engage a fixed forward gear ratio.

18. The transmission of claim 15 further comprising a first bevel gear in mesh with a second bevel gear and the first bevel gear is selectively rotationally connectable to the first member and the second bevel gear is connected to a final drive unit.

19. The transmission of claim 18 further comprising a first synchronizer assembly and a second synchronizer assembly, wherein the first synchronizer assembly selectively rotationally connects the drive gear of the first gear set to the first member and the second synchronizer assembly selectively rotationally connects the first bevel gear to the first member.

20. A transmission driven by an engine in a motor vehicle, the transmission comprising:
an input member connected to the engine;
an output member connected to a final drive unit;
a first member;
a second member coaxial with the first member and disposed within the first member;
a third member disposed parallel to the first and second members;
a dual clutch assembly having a first clutch and a second clutch, wherein the first clutch selectively connects the first member to the input member and the second clutch selectively connects the second member to the input member;
a fixed gear assembly having a first gear set and a second gear set, the first gear set having a drive gear in mesh with a driven gear where the drive gear of the first gear set is selectively rotationally connectable to the first member by a synchronizer and the driven gear of the first gear set is fixedly rotationally connected to the third member, and the second gear set having a first drive gear and a second drive gear both in mesh with a driven gear where the first drive gear of the second gear set is fixedly rotationally connected to the third member, the second drive gear of the second gear set is selectively rotationally connectable to the first member by the synchronizer, and the driven gear of the second gear set is fixedly rotationally connected to the output member; and
a continuously variable unit having a first pulley connected for common rotation directly with the second member, a second pulley connected for common rotation directly with the third member, and an endless member wrapped around the first pulley and the second pulley, and
wherein engagement of the first clutch produces at least one fixed gear ratio, engagement of the second clutch produces a continuously variable ratio, and engagement of both clutches distributes power between the fixed gear assembly and the continuously variable unit.

* * * * *